United States Patent Office 3,433,815
Patented Mar. 18, 1969

3,433,815
TREATMENT OF TALL OIL FATTY ACIDS
William C. Doyle, Jr., Gulf Breeze, Fla., assignor to Tenneco Chemicals, Inc., a corporation of Delaware
No Drawing. Filed May 12, 1964, Ser. No. 366,910
U.S. Cl. 260—419                                    7 Claims
Int. Cl. C11c *1/10*

ABSTRACT OF THE DISCLOSURE

The present invention relates to a novel method of treating tall oil fatty acids containing stilbene impurities to improve the color of the fatty acids and remove a substantial portion of the stilbene impurities which impart a reddish color to the fatty acids upon epoxidation. The present method involves treating the tall oil fatty acids with both a boron trifluoride catalyst and activated carbon. An aldehyde, for example, formaldehyde also may be used during the treatment with the catalyst and carbon. Thereafter, the catalyst and preferably the carbon are removed from the tall oil fatty acids by filtration through acid-activated clay, or by other means, and the filtrate is subjected to a distillation treatment and a distillate of tall oil fatty acids collected that contains a much smaller amount to stilbene impurities than the starting material. The carbon-catalyst treatment converts the stilbene impurities to derivatives having a higher boiling point than the fatty acids so that the derivatives are separated upon distillation and remain in the pot residue. The activated carbon is essential to prevent the catalyst from causing a large change in the relative amounts of oleic and linoleic acids present in the treated tall oil fatty acids as compared to the tall oi fatty acids in the starting material.

---

Crude tall oil is a dark, odoriferous material containing a large amount of rosin acids and fatty acids. In refining this crude material, the tall oil pitch and volatile fractions are separated and thereafter the tall oil is fractionated to separate a refined tall oil rosin fraction and a refined tall oil fatty acid fraction. Depending upon the procedure of distillation, the tall oil fatty acid fraction may contain up to 20%, by weight, of rosin acids. In addition to the rosin acids, the refined tall oil fatty acids will contain some unsaponifiable material, for example, up to about 5% of unsaponifiables. The impurities in tall oil fatty acids tend to impart undesirable color to the acids and tend to cause darkening when the acids are heated. Part of the unsaponifiables are stilbene compounds which cause the development of a red color upon epoxidation of the acids. This lack of color stability and development of red colors are serious drawbacks. Generally, tall oil fatty acids contain from about 0.1% to 0.6% of these stilbene impurities, which is excessive.

I have discovered a method of treating tall oil fatty acids to remove substantial amounts of the impurities including most of the stilbene compounds, all of which impart or cause the development of color. Elimination of the stilbene compounds reduces the development of the red color upon epoxidation of the tall oil fatty acids. In addition the product is lighter in color and has better color stability. These and other advantages of the present process and the products produced will become more readily apparent from the detailed description hereinafter set forth.

In accordance with the present invention tall oil fatty acids are treated with a boron trifluoride catalyst and activated carbon and thereafter the catalyst and carbon are removed. While this treatment improves the color of the tall oil fatty acids, it is preferable to distill the fatty acids and separate a distillate from a relatively small residue of higher boiling impurities. The distillate is lighter in color than the starting material or the treated tall oil fatty acids and contains a much smaller amount of unsaponifiables including stilbene impurities. The chemical reactions involved are not fully understood. The stilbene impurities in the original fatty acids are phenolic in character having absorption maxima at 298 m$\mu$ and 305 m$\mu$, tentatively identified as 3,4- and 3,5-disubstituted stilbene derivatives including 3-hydroxy-5-methoxystilbene. The present process converts most of the stilbene impurities to derivatives having a boiling point higher than the boiling point of the fatty acids so that fatty acids of high purity can be separated by distillation from a residue containing most of the stilbene impurities originally present.

An important feature of the present process is the use of activated carbon. Without the activated carbon there is produced a larger amount of material having a higher boiling point than the fatty acids so that the relatively large pot residue after distillation constitutes a loss considerably greater than when the activated carbon is present. In addition, and at times of greater importance, is the fact that the activated carbon binds and somehow prevents the catalyst from causing a large change in the relative amounts of oleic and linoleic acids. It is known that oleic and linoleic acids are easily isomerized and polymerized and apparently the activated carbon somehow binds the boron trifluoride catalyst in such a manner that these unwanted reactions are suppressed. Regardless of the chemical reactions involved, the activated carbon does reduce loss and suppresses changes in the relative amounts of oleic and linoleic acids present in the fatty acid portion of the treated and non-treated tall oil fatty acids.

The boron trifluoride catalyst may be boron trifluoride, as such, although it is somewhat preferable to use boron trifluoride in the liquid form of a molecular compound or complex with an organic compound such as an alcohol, ether, ester, acid, amine, or phenol. Illustrative of the organic compounds which may be used to form the boron trifluoride complex are diethyl ether, dipropyl ether, methyl acetate, acetic acid, propionic acid, ethanol, propanol, phenol, cresol, monoethylamine, and urea. Mixtures of these catalysts may be used. Excellent results have been obtained with boron trifluoride etherate, a molecular compound of boron trifluoride and diethyl ether containing about 50% boron trifluoride. The amount of catalyst may be varied considerably and unless stated differently, is based on the amount of boron trifluoride present, as such, or in the form of a complex. As little as 0.15% of catalyst based on the weight of tall oil fatty acids starting material will produce a noticeable effect. Preferably a minimum of about 0.25% of catalyst is used. Much larger amounts of catalyst may be used. Generally the amount of catalyst should not be more than 2% and preferably not more than about 1.25% by weight of the tall oil fatty acids. Here again, the amount of catalyst is based on the amount of boron trifluoride present. Larger amounts of catalyst tend to cause undesirable side reactions and an increase in the amount of pot residue when the treated acids are distilled.

The amount of activated carbon many be varied considerably and is determined, at least in part, by the amount of catalyst. Preferably at least one part of activated carbon is used for each part by weight of boron trifluoride present, either as such or as a complex. The optimum amount of activated carbon is about 2 parts of activated carbon for each part by weight of boron trifluoride. The use of more than 3 parts of activated carbon for each part of boron trifluoride does not improve the results to any appreciable extent.

It has been found that the boron trifluoride catalyst and activated carbon may be added separately to the tall oil fatty acids, or the boron trifluoride complex may be mixed with carbon prior to the addition to the tall oil fatty acids. Alternatively and for example, the activated carbon may be impregnated with gaseous boron trifluoride prior to addition to the tall oil fatty acids.

The reaction temperature during treatment of the tall oil fatty acids with activated carbon and boron trifluoride catalyst may vary from room temperature up to 100° C. At room temperature the reaction time is fairly long and may require up to 20 hours. At temperatures above 100° C. undesirable side reactions ay take place and the amounts of residue upon distillation are increased. Preferably, the temperature during such treatment is from 35° C. to 95° C. For tall oil fatty acids substantially free of or containing only small amounts of rosin acids, the optimum temperature is about 50° C. With larger amounts of rosin acids present in the tall oil fatty acids being treated, higher temperatures of about 80°–90° C. are optimum.

An aldehyde also may be used along with the activated carbon and boron trifluoride catalyst. The presence of an aldehyde improves the removal of the stilbene impurities at a given temperature of treatment. However, somewhat lighter-colored products are obtained when an aldehyde is not used. When an aldehyde is used, the presence of large amounts of rosin acids tends to interfere with the efficiency of the treatment. However, this can be compensated for by raising the temperature. If an aldehyde is used, it may be present in an amount of from about 0.15% to 5% by weight of the amount of tall oil fatty acids. Excellent results have been obtained with from about 0.5% to about 2% by weight of aldehyde based on the weight of tall oil fatty acids. While aqueous formaldehyde has been used with excellent results, other aldehydes such as paraformaldehyde, acetaldehyde, propionaldehyde, butyraldehyde, benzaldehyde, cinnamaldehyde, acrolein, chloral, succinaldehyde, or mixtures thereof may be used. Formaldehyde is readily available and normally is preferred.

The carbon preferably is removed prior to distillation by filtration. Removal of the carbon will also remove all or a large portion of the boron trifluoride catalyst depending upon the type of filtration. It is essential that all of the boron trifluoride catalyst be removed prior to distillation to prevent the formation of by-products having boiling points higher than the fatty acids whereby the amount of residue is increased as a result of the distillation treatment. The presence of even a small amount of catalyst during distillation or any other treatment involving heating to an elevated temperature can cause a change in the fatty acids and the relative amounts of oleic and linoleic acids. Preferably a filter aid is used during filtration and excellent results have been obtained by filtering the treated acids through acid-activated clay. While the use of acid-activated clay is preferred as it efficiently removes all of the carbon and catalyst and in general the use of activated clay results in a lighter-colored product, it is to be understood that other procedures may be used for removing the catalyst. Filtration of the treated acid through, for example, filter paper, is fairly effective in removing the activated carbon. However, the filtrate usually will contain some of the catalyst. This residual catalyst can be removed by washing the tall oil fatty acids or by blowing the tall oil fatty acids with steam. Preferably, the wash water is slightly alkaline to facilitate removal of the catalyst. Sodium or potassium hydroxide may be added to the wash water for this purpose. Prior to final separation of the alkaline wash water from the treated fatty acids, it is preferable that a small amount of acid be added that will neutralize any free alkali and convert any saponified fatty acid back to the acid form. Saponified fatty acids tend to hinder separation of the wash water. Excellent results may be obtained by the use of acetic acid for this purpose. However, other acids, including mineral acids, may be used for this purpose.

Preferably, and after removal of the activated carbon and the boron trifluoride catalyst, the tall oil fatty acids are distilled to separate a relatively pure distillate from a pot residue containing higher boiling impurities including the stilbene impurities which have been converted to higher boiling derivatives. Distillation should be effected under a partial vacuum so as to avoid heating to a temperature above 300° C. to prevent undesirable decomposition of the fatty acids and the possible formation of color bodies. Excellent results can be obtained at a pressure of from 3 mm. to 6 mm. of mercury although somewhat higher pressures may be used if heating to above 300° C. is avoided. The amount of residue will vary to a certain extent depending in part upon the impurities present. In general the larger the amount of rosin acids, the larger the residue.

The proportions of the fatty acids present in tall oil fatty acids will vary to some extent depending upon the source and method used to separate and refine the tall oil fatty acids. The amount of rosin acids also will vary. The fattey acids in tall oil fatty acids primarily consist of oleic acids and linoleic acids. Usually all of the fatty acids containing one double bond and 18 carbon atoms are considered as being oleic acid and all of the fatty acids containing two double bonds and 18 carbon atoms are considered as being linoleic acid. Typical, refined tall oil fatty acids contain about 45–55% oleic acid, about 35–50% linoleic acid and about 5–15% other acids, based on the total amount of fatty acids, plus some unsaponifiables and some rosin acids.

EXAMPLE 1

In a flask fitted with stirrer and thermometer, 250 g. of tall oil acids containing about 14% resin acids, 0.5% stilbenes and having a Gardner color of 6–7 was heated to 80° C. In rapid succession there was added 2.5 g. of activated carbon (pulverized) and 2.5 g. of boron fluoride etherate. The mixture was stirred at 80° C. for one-half hour and then filtered by suction through a 1 cm. bed of acid activated clay. The filtrate (213 g., color 6–7) was pot distilled to 250° C. pot temperature at about 0.6 mm. through a short entrainment separator, giving 197 g. of clear distillate having a Gardner color of less than 1 and containing 0.09% stilbenes. The residue (14 g.) amounted to 7% of the charge to the distillation. Distillations of untreated tall oil acids under the same conditions have given 4–6% residue. The treated material remaining on the filter cake may be partially recovered by washing with benzene or by reuse of the cake in subsequent runs.

EXAMPLE 2

To 250 g. of tall oil fatty acids containing 10% resin acids and 0.51% stilbene impurities at 80° C. was added 1.25 g. of activated carbon, 1.25 g. of boron fluoride etherate and 3.4 g. of 37% aqueous formaldehyde. After stirring at 80° C. for one-half hour the mixture was filtered and distilled as in Example 1. The filtrate (208 g., Gardner color 5) gave, on distillation, 182 g. of distillate having 0.04% stilbenes and Gardner color 1–2 and 22 g. (10.6%) residue.

EXAMPLE 3

Purified tall oil fatty acids (250 g.) having less than 1% resin acids, Gardner color 4–5, and 0.49% stilbenes was stirred with 1.25 g. activated carbon, 1.25 g. boron fluoride etherate and 3.4 g. of 37% aqueous formaldehyde for 2 hours at 50° C. Filtration and distillation as in Example 1 gave 217 g. of filtrate and, from this, 211 g. of distillate and 5 g. (2%) of residue. A comparable distillation of untreated tall oil fatty acids also gave 2% residue. The properties of the starting material and distilled treated product are compared in Table I.

TABLE 1

|  | Starting fatty acids | Distilled product |
|---|---|---|
| Color (Gardner) | 4-5 | 1 |
| Percent elaidic acid | 1.3 | 1.8 |
| Percent linolelaidic acid | 3.6 | 4.7 |
| Percent conjugation (as conjugated linoleic acid) | 9.5 | 8.2 |
| Percent stilbenes | 0.49 | 0.04 |

Thus, the treating process had very little effect on the oleic and linoleic acid content of the fatty acid mixture as shown by the very little change in the amounts of the acids set forth above.

EXAMPLE 4

Four runs were carried out by the procedure described in Example 1 except that various catalysts were used and the treatment was at 50° C. for 3 hours and the tall oil fatty acids initially contained less than 2% of rosin acids.

TABLE II

| Run No. | Initial | | Percent Carbon | BF₃ form | Percent As BF₃ | Product | | Percent residue |
|---|---|---|---|---|---|---|---|---|
| | Color | Percent stilbene | | | | Color | Percent stilbene | |
| 1 | 4-5 | 0.33 | 1 | Etherate | 0.5 | <1 | 0.08 | 2 |
| 2 | 4-5 | 0.33 | 1 | Acetate | 0.5 | 1 | 0.08 | 2.1 |
| 3 | 3 | 0.47 | 1 | Etherate | 0.5 | <1 | 0.13 | 1.8 |
| 4 | 3 | 0.47 | 1 | Gas | 0.5 | 1 | 0.25 | 1.2 |

In Run No. 4 the carbon was impregnated with gaseous boron trifluoride prior to being added to the tall oil fatty acids.

EXAMPLE 5

A quantity of tall oil fatty acids (A) containing less than 2% rosin acids was treated with 0.5% activated carbon, 0.5% boron trifluoride etherate, and 0.5% formaldehyde (37% aqueous formaldehyde used) at 50° C. for 2 hours. A second quantity of tall oil fatty acids (B) containing less than 2% rosin acids was treated with 1% activated carbon and 1% boron trifluoride etherate at 50° C. for 3 hours. In each instance the treated tall oil fatty acids were filtered, distilled and an upgraded distillate recovered as described in Example 1. Both the original acids and the distillate was analyzed and the results, percent by weight, are set forth in the following table.

TABLE III

|  | Acids A | | Acids B | |
|---|---|---|---|---|
| | Original | Distillate | Original | Distillate |
| Below stearic acid | 1.5 | 1.9 | 1.4 | 2.1 |
| Stearic acid | 2.3 | 1.8 | 1.7 | 2.2 |
| Oleic acid | 48.8 | 50.4 | 49.5 | 51.4 |
| Isooleic acid | 2.0 | 1.3 | 2.1 | 1.3 |
| Linoleic acid | 34.6 | 35.4 | 36.5 | 36.3 |
| Isolinoleic acid | 2.9 | 2.8 | 2.4 | 2.9 |
| Conjugation linoleic isomer | 3.8 | 2.4 | 3.4 | 1.3 |
| Do | 1.4 | 1.4 | 1.0 | 1.1 |
| Do | 2.7 | 2.0 | 2.0 | 1.4 |
| Percent stilbene | 0.49 | 0.04 | 0.47 | 0.13 |
| Percent conjugation | 9.5 | 7.5 | 10.5 | |
| Percent elaidic acid | 1.3 | 2.9 | 4.2 | |
| Percent linolelaidic acid | 3.6 | 2.9 | 9.2 | |
| Titre, °C | 4.6 | 5.8 | 4.5 | 6.2 |

EXAMPLE 6

Three slightly different quantities of tall oil fatty acids, each containing 14-15% rosin acids, were each treated with 0.5% activated carbon, 0.5% boron fluoride, and 0.5% formaldehyde at 80° C. for 0.5 hour. One of these (Run A) was filtered through activated clay as described in Example 1. Another (Run B) was filtered through filter paper and steam was then bubbled through the filtrate under reduced pressure at liquid temperature of 60°-70° C. The third (Run C) was filtered through filter paper and not further treated. All three filtrates were distilled as described in Example 1 with the following results:

TABLE IV

| Run | Original | | Distilled product | | Percent residue |
|---|---|---|---|---|---|
| | Color | Percent stilbenes | Color | Percent stilbenes | |
| A | 5-6 | 0.51 | 1-2 | 0.05 | 7.4 |
| B | 5-6 | 0.51 | 3-4 | 0.06 | 8.8 |
| C | 6-7 | 0.50 | 4-5 | 0.08 | 20.7 |

In terms of distillation residue and content of stilbene impurities in the distillate the steamed run (B) compares favorably with Run A. The color, however, is not as god. In Run C the filter paper did not remove all of the catalyst as shown by the large residue.

EXAMPLE 7

Two hundred fifty grams of fatty acids (less than 2% rosin acids, Gardner color 4, 0.52% stilbene impurities) were stirred at 50° C. for 3 hours with 2.5 g. activated carbon and 2.5 g. boron trifluoride etherate and then filtered through filter paper. The filtrate was washed with two 250 ml. portions of distilled water, dried over 30 g. of sodium sulfate. The dried acids were filtered through filter paper and the filtrate pot distilled as described in Example 1. The distillate was color 1 and contained 0.14% stilbene impurities.

In all of the foregoing examples the color number is the Gardner color and all percentages are by weight.

I claim:

1. The process of treating tall oil fatty acids containing stilbene impurities comprising contacting such tall oil fatty acids at a temperature below 100° C. with acid activated carbon and with at least one boron trifluoride catalyst selected from the group consisting of boron trifluoride and a molecular compound of boron trifluoride and an alcohol, ether, ester, amine or phenol, the amount of said catalyst containing from 0.15% to 2% of BF₃ based on the weight of fatty acids and the amount acid activated carbon being at least equal to the amount of BF₃, separating the catalyst from the tall oil fatty acids, distilling the tall oil fatty acids at a temperature below 300° C. and thereby separating a distillate product of tall oil fatty acids containing less stilbene impurities than the starting tall oil fatty acids from a residue containing a major portion of the stilbene impurities.

2. The process of treating tall oil fatty acids as claimed in claim 1 in which the temperature is in the range of from 35° C. to 95° C. during contact of the fatty acids with the acid activated carbon and catalyst.

3. The process of treating tall oil fatty acids as claimed in claim 2 in which the carbon and catalyst are separated by filtering the fatty acids through acid-activated clay.

4. The process of treating tall oil fatty acids as claimed in claim 3 in which the catalyst is boron trifluoride etherate.

5. The process of treating tall oil fatty acids as claimed in claim 4 in which the amount of activated carbon is in the range of from 1 to 3 parts for each part of boron trifluoride in the catalyst.

6. The process of treating tall oil fatty acids as claimed in claim 5 in which the contacting period is from 0.5 to 4 hours.

7. The process of treating tall oil fatty acids as claimed in claim 2 in which the tall oil fatty acids are also contacted with from 0.15% to 5% of formaldehyde based on the weight of tall oil fatty acids.

References Cited

UNITED STATES PATENTS

| | | | |
|---|---|---|---|
| 3,257,438 | 6/1966 | Wicke et al. | 260—419 |
| 3,066,160 | 11/1962 | Hampton | 260—419 |
| 2,475,420 | 7/1949 | Brown et al. | 260—419 |

ALEX MAZEL, *Primary Examiner.*

J. A. NORCAVAGE, *Assistant Examiner.*

U.S. Cl. X.R.

260—413